(12) United States Patent
Shiihara (10) Patent No.: US 11,442,504 B2
(45) Date of Patent: Sep. 13, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Tsutomu Shiihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/177,539

(22) Filed: Nov. 1, 2018

(65) Prior Publication Data
US 2019/0146555 A1 May 16, 2019

(30) Foreign Application Priority Data
Nov. 15, 2017 (JP) .............................. JP2017-220120

(51) Int. Cl.
*G06F 1/16* (2006.01)
*G06V 40/20* (2022.01)
*G06V 40/16* (2022.01)

(52) U.S. Cl.
CPC .......... *G06F 1/1637* (2013.01); *G06V 40/172* (2022.01); *G06V 40/174* (2022.01); *G06V 40/23* (2022.01)

(58) Field of Classification Search
CPC .......... G06F 1/1637; G06F 3/147; G06F 1/16; G06F 1/1601; G06F 1/181; G06F 3/0304; G06F 3/0482; G06F 3/04845; G06K 9/00288; G06K 9/00302; G06K 9/00342; G06V 40/172; G06V 40/174; G06V 40/23; G09G 3/20; G09G 2340/0464; G09G 2340/0492; G09G 2354/00
See application file for complete search history.

(56) References Cited

U.S. PATENT DOCUMENTS

| | | | |
|---|---|---|---|
| 9,158,449 B2 | 10/2015 | Matsubara et al. | |
| 2011/0157046 A1* | 6/2011 | Lee | ........................ G06F 1/1643 345/173 |
| 2013/0040567 A1* | 2/2013 | Matsubara | ............ G06F 3/0482 455/41.1 |

(Continued)

FOREIGN PATENT DOCUMENTS

| | | |
|---|---|---|
| JP | 2011-248767 A | 12/2011 |
| JP | 2013-003742 A | 1/2013 |

(Continued)

OTHER PUBLICATIONS

Jun. 1, 2021 Office Action issued in Japanese Patent Application No. 2017-220120.

(Continued)

*Primary Examiner* — Md K Talukder
(74) *Attorney, Agent, or Firm* — Oliff PLC (57) ABSTRACT

An information processing apparatus includes a display device, a detection unit that detects a terminal apparatus located around the information processing apparatus and carried by a user, and a display control unit that causes the display device to display a terminal image, which is an image corresponding to the terminal apparatus detected by the detection unit, and an information image, which is an image corresponding to information to be provided for the terminal apparatus.

14 Claims, 10 Drawing Sheets

(56) References Cited

U.S. PATENT DOCUMENTS

| | | | | |
|---|---|---|---|---|
| 2013/0162566 A1* | 6/2013 | Yajima | G09G 5/006 | 345/173 |
| 2014/0071159 A1* | 3/2014 | Ye | G06F 3/0304 | 345/619 |
| 2014/0145988 A1* | 5/2014 | Ishizawa | H04L 67/06 | 345/1.3 |
| 2014/0320912 A1* | 10/2014 | Kubo | G06F 3/1454 | 358/1.15 |
| 2015/0093032 A1* | 4/2015 | Nakao | G06K 9/6293 | 382/195 |
| 2015/0264799 A1* | 9/2015 | Kurata | G06F 1/163 | 361/749 |
| 2015/0319617 A1* | 11/2015 | Wang | H04W 12/08 | 455/411 |
| 2016/0077592 A1* | 3/2016 | Bhesania | G06F 3/0346 | 345/650 |
| 2016/0142624 A1* | 5/2016 | Niigaki | G06F 3/012 | 348/333.12 |
| 2016/0157372 A1* | 6/2016 | Hiroki | G06F 1/163 | 361/679.01 |
| 2016/0217350 A1* | 7/2016 | Shionozaki | G06T 7/70 | |
| 2016/0284048 A1* | 9/2016 | Rekimoto | H04N 5/23238 | |
| 2017/0019735 A1* | 1/2017 | Song | H04S 7/301 | |
| 2019/0146555 A1* | 5/2019 | Shiihara | G06F 3/0304 | 361/679.26 |
| 2019/0222828 A1* | 7/2019 | Salvador | H04N 13/351 | |

FOREIGN PATENT DOCUMENTS

| | | |
|---|---|---|
| JP | 2013-145451 A | 7/2013 |
| JP | 2013-205945 A | 10/2013 |
| JP | 6101393 B1 | 3/2017 |

OTHER PUBLICATIONS

Oct. 5, 2021 Office Action issued in Japanese Patent Application No. 2017-220120.

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-220120 filed Nov. 15, 2017.

BACKGROUND

Technical Field

The present invention relates to an information processing apparatus and a non-transitory computer readable medium.

SUMMARY

According to an aspect of the invention, there is provided an information processing apparatus including a display device, a detection unit that detects a terminal apparatus located around the information processing apparatus and carried by a user, and a display control unit that displays, on the display device, a terminal image, which is an image corresponding to the terminal apparatus detected by the detection unit, and an information image, which is an image corresponding to information to be provided for the terminal apparatus.

BRIEF DESCRIPTION OF THE DRAWINGS

An exemplary embodiment of the present invention will be described in detail based on the following figures, wherein:

FIG. 3 is a diagram illustrating functional units achieved by a central processing unit (CPU) of the information processing apparatus and the like;

DETAILED DESCRIPTION

An exemplary embodiment of the present invention will be described hereinafter with reference to the accompanying drawings.

Figure 1A:
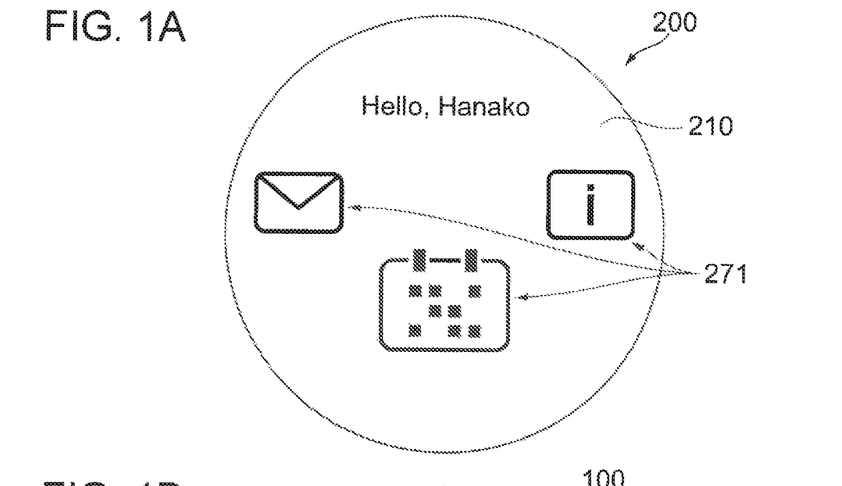
FIGS. 1A and 1B are diagrams illustrating an information processing apparatus.
Figure 1B:
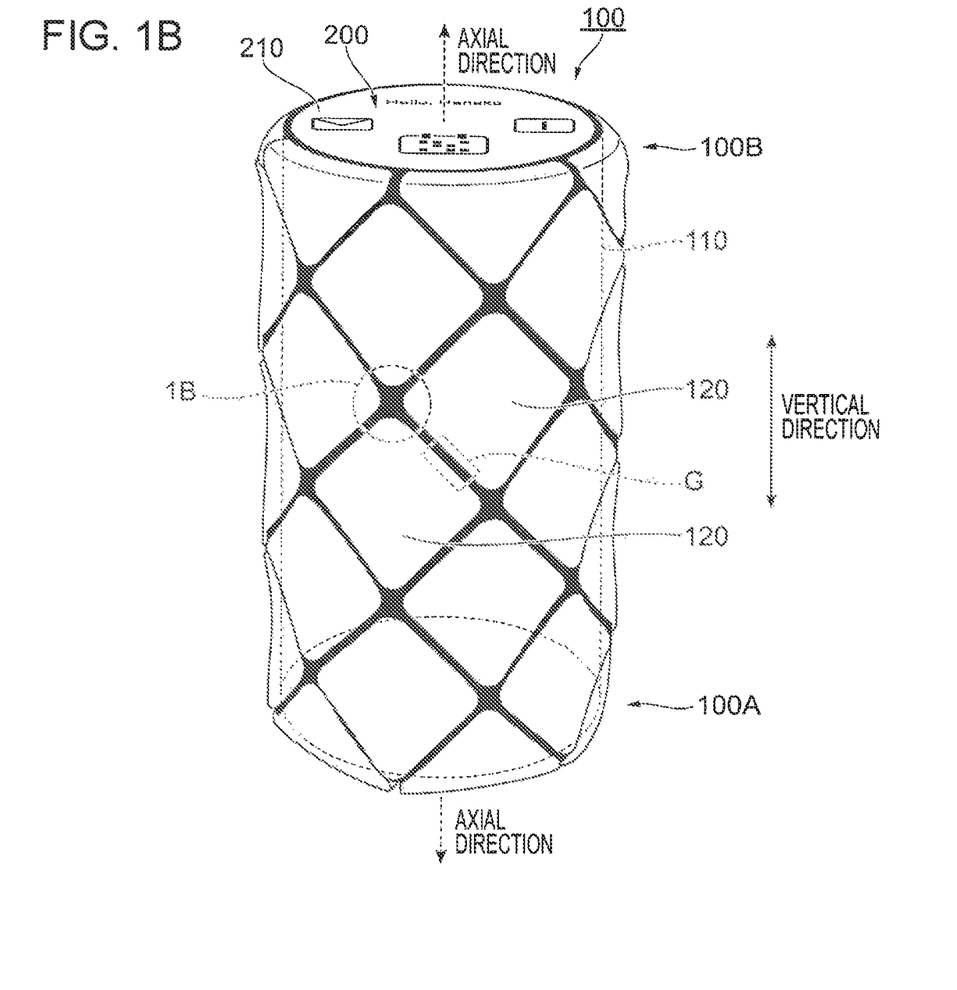

FIGS. 1A and 1B are diagrams illustrating an information processing apparatus 100 according to present exemplary embodiment. FIG. 1A is a plan view of the information processing apparatus 100, and FIG. 1B is a perspective view of the information processing apparatus 100.

As illustrated in FIG. 1B, the information processing apparatus 100 according to the present exemplary embodiment has a columnar shape and extends in a vertical direction. More specifically, an end 100A is located on a floor face side, and the other end 100B is provided with a display device 200 facing upward.

The "columnar shape" refers to a shape that extends from an end in one direction.

The columnar shape can be a tubular shape or a solid shape. The columnar shape can also be a shape including a hollow within. The columnar shape can also be a shape whose dimension in an axial direction is smaller than a dimension in a radial direction, such as disc shape.

A place where the information processing apparatus 100 is installed is not particularly limited, but may be installed in, for example, a common space, a meeting room, or the like in an office. Alternatively, the information processing apparatus 100 is installed in a public, facility such as a station.

The information processing apparatus 100 is connected to an external server (not illustrated) through a communication line such as the Internet and communicates information with the external server. The information processing apparatus 100 also plays a role of an edge server.

As illustrated in FIG. 1B, the information processing apparatus 100 is formed such that a cross-section thereof in a plane perpendicular to the axial direction thereof has a round shape. The display device 200 is provided on a top of the information processing apparatus 100, and a display screen 210 of the display device 200 also has a round shape (refer to FIG. 1A).

The cross-section of the information processing apparatus 100 may have an elliptical shape, instead of a round shape. Alternatively, the cross-section of the information processing apparatus 100 may have a polygonal shape, such as a tetragonal shape or a pentagonal shape. The cross-section of the information processing apparatus 100 may have any other kind of shape.

The shape of the cross-section of the information processing apparatus 100 may differ at different positions in the axial direction of the information processing apparatus 100. For example, a bottom of the information processing apparatus 100 may have a tetragonal shape, and the top of the information processing apparatus 100 may have a round shape.

Alternatively, for example, the display device 200 may be provided on the top of the information processing apparatus 100, and legs extending downward may be provided at the bottom of the display device 200.

The shape of the display screen 210 of the display device 200, too, may have an elliptical shape or a polygonal shape such as a tetragonal shape, instead of a round shape.

As illustrated in FIG. 1B, the information processing apparatus 100 includes a cylindrical body 110 and exterior members 120 attached on a circumferential surface of the body 110.

The exterior members 120 each have a tetragonal shape, and diagonal lines thereof extend in the vertical direction and a horizontal direction, respectively. Gaps G are provided between adjacent exterior members 120.

Figure 2:
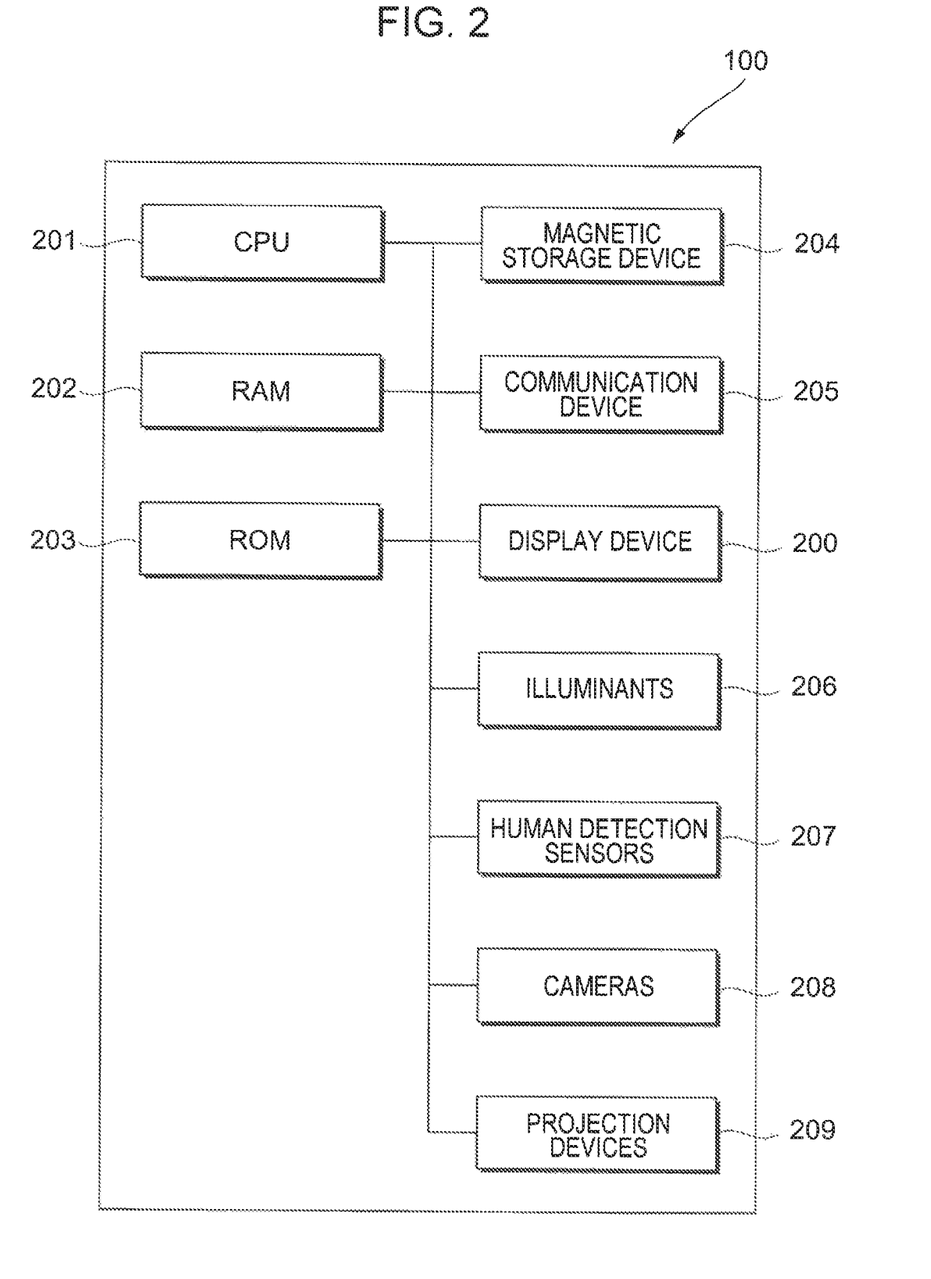
FIG. 2 is a diagram illustrating the hardware configuration of the information processing apparatus.

FIG. 2 is a diagram illustrating the hardware configuration of the information processing apparatus 100.

As illustrated in FIG. 2, the information processing apparatus 100 includes a CPU 201, a random-access memory (RAM) 202, a read-only memory (ROM) 203, and a magnetic storage device 204. The information processing apparatus 100 also includes a communication device (communication interface) 205 for communicating with the outside.

The communication device 205 communicates with the external server. The communication device 205 also communicates with a terminal apparatus, which will be described later. The communication device 205 communicates with the terminal apparatus using a wireless communication method. A known wireless communication method, such as wireless fidelity (Wi-Fi; registered trademark), Bluetooth (registered trademark), ZigBee (registered trademark), or ultra-wideband (UWB), may be used.

The ROM 203 and the magnetic storage device 204 store programs to be executed by the CPU 201. The CPU 201 reads a program stored in the ROM 203 or the magnetic storage device 204 and executes the program using the RAM 202 as a working area.

The CPU 201 executes a program stored in the ROM 203 or the magnetic storage device 204 to achieve one of functional units, which will be described later.

The programs to be executed by the CPU 201 may be stored in a computer-readable recording medium such as a magnetic recording medium (a magnetic tape, a magnetic disk, etc.), an optical recording medium (an optical disc, etc.), a magneto-optical recording medium, or a semiconductor memory and provided for the information processing apparatus 100. Alternatively, the programs to be executed by the CPU 201 may be downloaded to the information processing apparatus 100 using a communication medium such as the Internet.

The information processing apparatus 100 also includes the display device 200, illuminates 206 including light-emitting diodes (LEDs), human detection sensors 207, cameras 208, and projection devices 209 that project images.

The display device 200 is, for example, a touch panel display. The display device 200 displays information to users and receives operations from the users.

The illuminants 206 each include a light source such as an LED and a control board that turns on and off the light source.

The human detection sensors 207 are infrared sensors, for example, and detect users around the information processing apparatus 100.

The cameras 208, each of which is an example of an image capture device, each include a charge-coupled device (CCD) image sensor and capture an image of surroundings of the information processing apparatus 100.

The projection devices 209 are so-called projectors and project images onto walls and the floor around the information processing apparatus 100.

Figure 3:
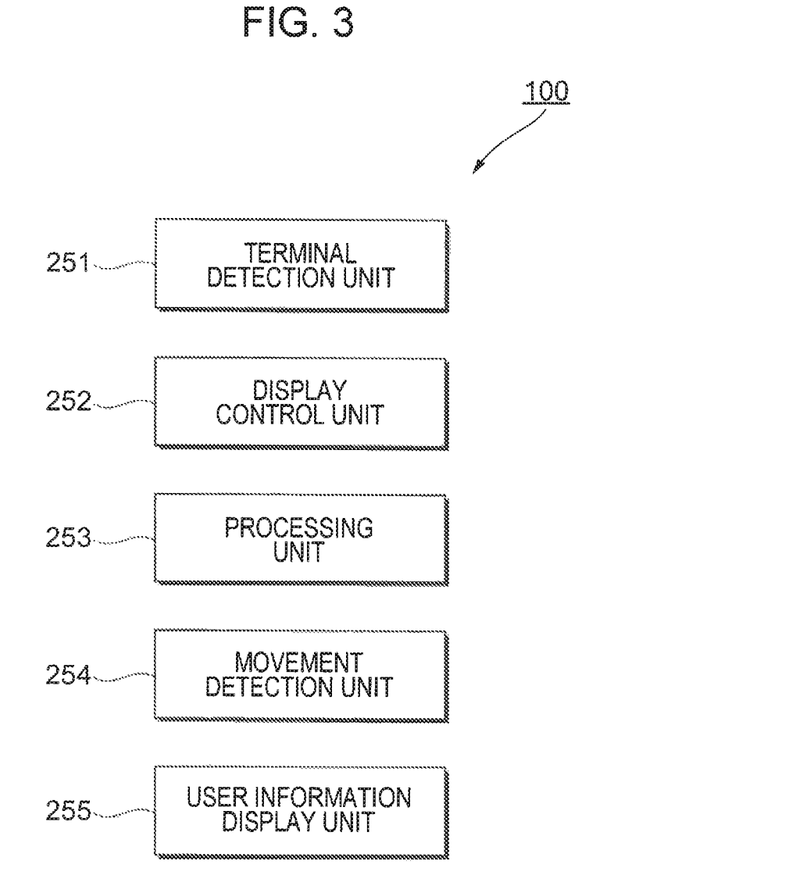

FIG. 3 is a diagram illustrating the functional units achieved by the CPU 201 of the information processing apparatus 100 and the like. The CPU 201 executes the programs stored in the ROM 203 and the magnetic storage device 204 to achieve the functional units illustrated in FIG. 3.

As illustrated in FIG. 3, the information processing apparatus 100 according to the present exemplary embodiment includes a terminal detection unit 251, a display control unit 252, a processing unit 253, a movement detection unit 254, and a user information display unit 255.

The terminal detection unit 251, which is an example of a detection unit, analyzes information received by the communication device 205 (receives information transmitted from the terminal apparatus and indicating the identity of the terminal apparatus) and detects the terminal apparatus around the information processing apparatus 100.

The display control unit 252, which is an example of a display control unit, controls the display device 200.

The processing unit 253, which is an example of a processing unit, receives a user operation performed on the display device 200 and performs a process associated with the user operation in advance.

The movement detection unit 254, which is an example of a detection unit, analyzes images output from the cameras 208 and detects the movement of users around the information processing apparatus 100.

The user information display unit 255, which is an example of a user information display unit, changes colors of the illuminants 206 to display information regarding users around the information processing apparatus 100.

The information processing apparatus 100 will be further described again with reference to FIGS. 1A and 1B.

As described above (as illustrated in FIG. 1B), the gaps G are provided between adjacent exterior members 120 in the present exemplary embodiment. In the present exemplary embodiment, the illuminants 206, the human detection sensors 207, the cameras 208, and the projection devices 209 are provided in the gaps G.

More specifically, an illuminant 206, a human detection sensor 207, a camera 208, and a projection device 209 are provided between (e.g., position 1B illustrated in FIG. 1B) a corner of an exterior member 120 and a corner of another exterior member 120 adjacent to the foregoing exterior member 120.

The illuminants 206, the human detection sensors 207, the cameras 208, and the projection devices 209 are arranged not just t one position but at plural positions different from one another in a circumferential direction of the information processing apparatus 100.

In the present exemplary embodiment, the human detection sensors 207 are provided, and if a user approaches the information processing apparatus 100, the human detection sensors 207 detect the user. More specifically, if a user enters a range of 5 m, for example, from the information processing apparatus 100 (a range of a certain distance from the information processing apparatus 100), the human detection sensors 207 detect the user.

Furthermore, in the present exemplary embodiment, the processing unit 253 recognizes the user's face on the basis of information obtained from one of the cameras 208 and identifies the user. In the present exemplary embodiment, as illustrated in FIG. 1A, the display device 200 displays images corresponding to the user. The projection devices 209 may display images on a wall or the floor in addition to or instead of, the images displayed on the display device 200.

In this example, a user whose name is Hanako has been recognized. Images corresponding to Hanako are displayed on the display screen 210.

More specifically, the display screen 210 displays selection images (selection buttons) 271 to be selected by the user. If the user presses any of the selection images 271, the processing unit 253 performs a process, such as transmission of a mail or display of information, corresponding to the selected selection image 271. Although the display screen 210, which is a touch panel, receives a user operation in the present exemplary embodiment, a sensor that detects vibration of the floor, for example, may be provided and detect a user operation by detecting tapping on the floor.

In addition, although the cameras 208 recognize (identify) a user in the present exemplary embodiment, a user may be recognized using another method, instead.

For example, information may be obtained from a terminal apparatus (described later) carried by a user in order to recognize the user. Alternatively, a card reader may read information stored in an identification (ID) card carried by a user in order to recognize the user.

Figure 4:
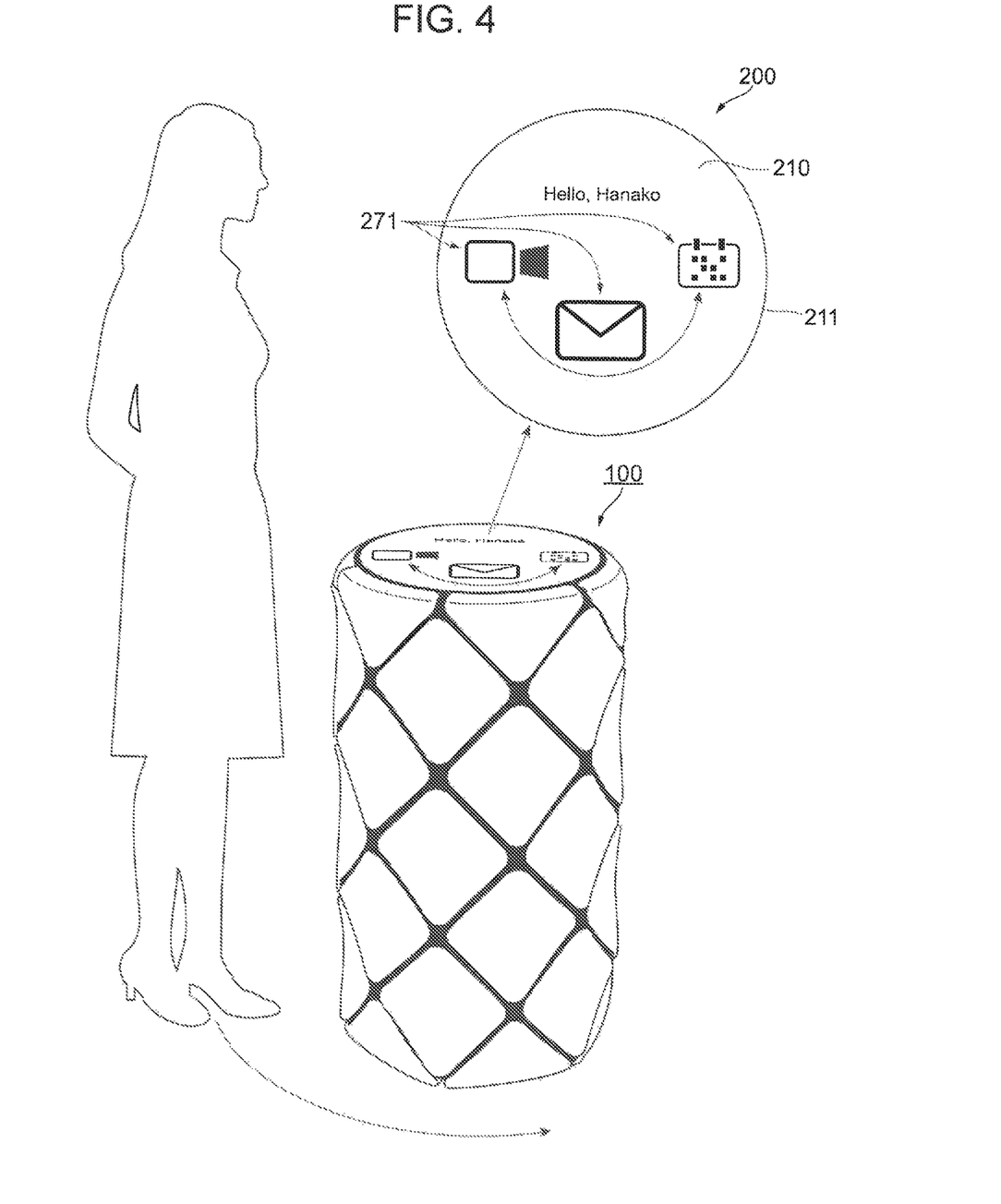
FIG. 4 is a diagram illustrating a display screen at a time when a user around the information processing apparatus 100 has moved.

FIG. 4 is a diagram illustrating the display screen 210 at a time when a user around the information processing apparatus 100 has moved.

In the present exemplary embodiment, if the user moves in the circumferential direction of the information processing apparatus 100 around the information processing apparatus 100, the movement detection unit 254 (refer to FIG. 3) detects the movement of the user.

More specifically, the movement detection unit 254 analyzes images output from the cameras 208 to detect the movement of the user (the movement in the circumferential direction of the information processing apparatus 100).

In the present exemplary embodiment, if the movement detection unit 254 detects the movement of the user, the display control unit 252 causes the display device 200 to change a content of display displayed on the display device 200.

More specifically, if the user moves in the circumferential direction, the display control unit 252 causes images (selection images 271) displayed on the display device 200 to move along a circumference 211 of the display screen 210.

In the present exemplary embodiment, the selection images 271 are moved same direction in which the user moves. In this example, the user moves counterclockwise, and the selection images 271 accordingly move counterclockwise.

Furthermore, in the present exemplary embodiment, when the selection images 271 move by one image, a selection image 271 at a most downstream position in a movement direction disappears, and a new selection image 271 appears at a most upstream position in the movement direction.

In other words, in the present exemplary embodiment, selection images 271 fewer than the total number of selection images 271 are displayed, and if the user roves, some of the selection images 271 are removed, and other selection images 271 are newly displayed.

Although the selection images 271 move in the same direction in which the user moves in the above description, the selection images 271 may move in a direction opposite to a direction in which the user moves, instead.

FIGS. 5A to 5E are diagrams illustrating other examples of the images displayed on the display device 200.

In the present exemplary embodiment, plural users can be identified. If there are plural user around the information processing apparatus 100, the display screen 210 displays images corresponding to the plural users.

Figure 5A:
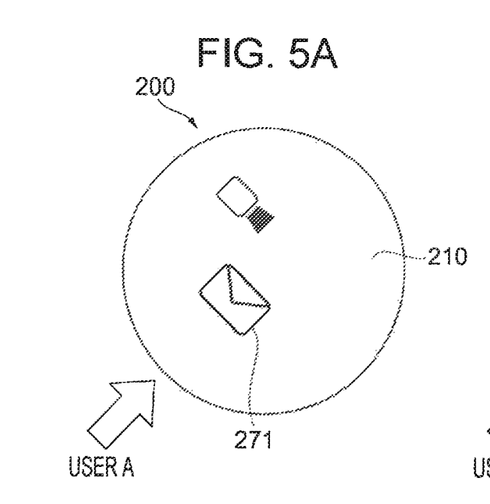
FIGS. 5A to 5E are diagrams illustrating other examples of images displayed on a display device.

More specifically, in the present exemplary embodiment, if there is one user around the information processing apparatus 100, images illustrated in FIG. 5A are displayed. If there are two users around the information processing apparatus 100, for example, images illustrated in FIG. 5B are displayed.

Figure 5B:
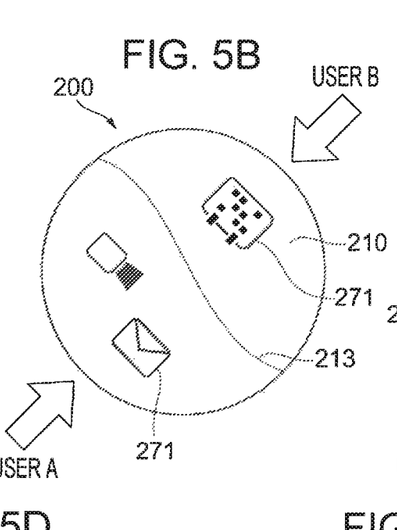

The display screen 210 illustrated in FIG. 5B displays a selection image 271 corresponding to a user A on a side of the user A (near the user A) and a selection image 271 corresponding to a user B on a side of the user B (near the user B).

Furthermore, a boundary line 213 is displayed between the selection image 271 corresponding to the user A and the selection image 271 corresponding to the user B.

In other words, in the present exemplary embodiment, the selection images 271, which are examples of a corresponding image displayed in accordance with each user, are displayed near users corresponding thereto. Furthermore, the boundary line 213 that defines an area for one user and an area for another user is displayed between the selection images 271 displayed in accordance with the users.

As a result, it becomes unlikely for a user to select a selection image 271 displayed for another user.

Figure 5C:
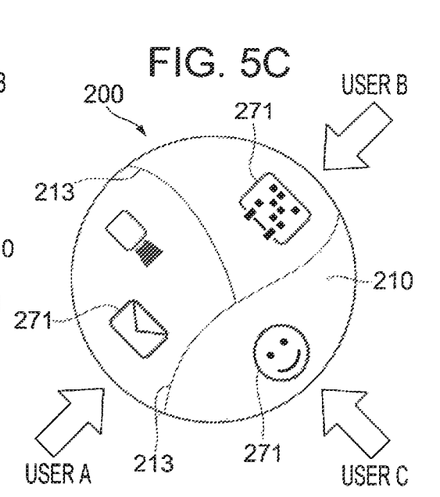

FIG. 5C illustrates the display screen 210 at a time when there are the user A, the user B, and a user C around the information processing apparatus 100.

In this case, too, selection images 271 are displayed near the users corresponding thereto. Furthermore, as in the above case, boundary lines 213 are displayed between the selection images 271 displayed in accordance with the users adjacent to one another.

Figure 5D:
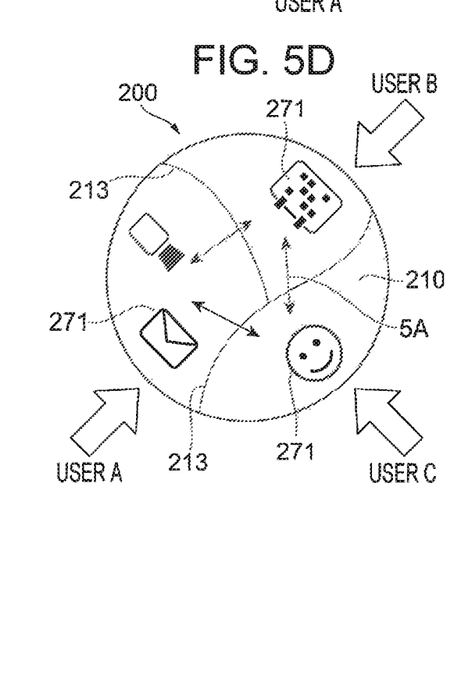

Furthermore, the present exemplary embodiment, a selection image 271 in an area corresponding to a user can be moved to another area corresponding to another user as indicated by arrows 5A illustrated in FIG. 5D, A file (information), for example, owned by a user can thus be provided for another user.

Figure 5E:
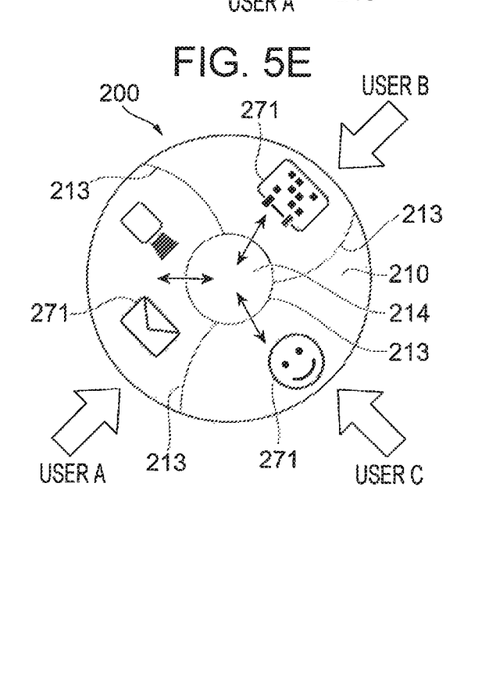

In an example illustrated in FIG. 5E, a round area 214 defined by a round boundary line 213 is provided at the center of the display screen 210.

In other words, in this example, a common area shared by the plural users is provided at the center of the display screen 210. Here, the common area is an area in which the selection images 271 are not displayed.

In the example illustrated in F g. 5E, the users can move the selection images 271 in their own areas to the common area. If a selection image 271 is moved to the common area, the selection image 271 is displayed in the common area.

In addition, in the present exemplary embodiment, another user can move the selection image 271 from the common area to his/her own area and obtain information corresponding to the selection image 271.

Figure 6:
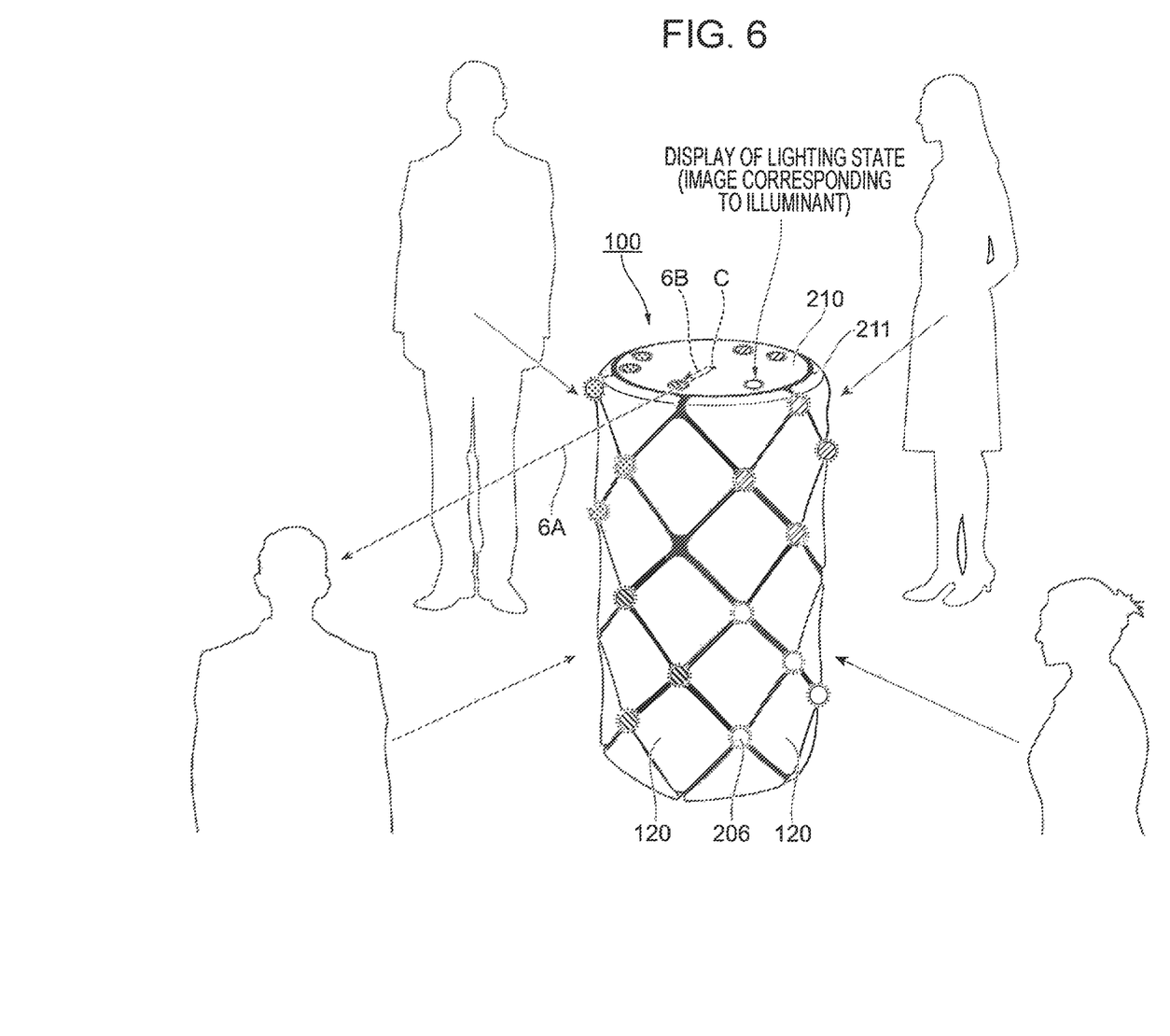
FIG. 6 is a diagram illustrating another operation state of the information processing apparatus.

FIG. 6 is a diagram illustrating another operation state of the information processing apparatus 100.

As described above, the illuminants 206 are provided between the exterior members 120 in the present exemplary embodiment. Furthermore, the illuminants 206 are arranged such that positions thereof are different from one another in the circumferential direction of the information processing apparatus 100.

In the present exemplary embodiment, the colors of the illuminants 206 change to display information regarding users around the information processing apparatus 100.

More specifically, the user information display unit 255 (refer to FIG. 3) controls the illuminants 206 and displays information regarding the users around the information processing apparatus 100.

More specifically, the user information display unit 255 analyzes information output from the cameras 208 (not illustrated in FIG. 6). More specifically, the user information display unit 255 analyzes parts of images obtained by the cameras 208 including the users' faces to identify the users' facial expressions.

The user information display unit 255 then determines the users' feelings on the basis of results of the analysis. More specifically, the user information display unit 255 calculates feature values of the users' facial expressions obtained from the cameras 208 and determines the users' feelings on the basis of the feature values.

The user information display unit 255 then changes the colors of the illuminants 206 on the basis of the determined feelings. More specifically, for example, when a user is calm, green or blue light is emitted, and when a user is upset, yellow or red light is emitted.

As a result, in the present exemplary embodiment, states of the users around the information processing apparatus 100 can be determined by referring to a circumferential surface of the information processing apparatus 100.

Although information regarding the users' feelings is displayed as information regarding the users in the present exemplary embodiment, this is just an example. For example, body temperatures of the users may be detected, and information regarding the users' conditions may be displayed, instead.

When the illuminants 206 turn on for each user, illuminants 206 facing the user turn on.

In other words, when the information processing apparatus 100 is viewed from above, the illuminants 206 turn on such that a direction from a center C of the display screen 210 to a user (e.g., a direction GA) and a direction from the center C of the display screen 210 to illuminants 206 indicating the user's feeling (e.g., a direction 6B) match. In other words, illuminants 206 on a line connecting an axis of the information processing apparatus 100 and the user turn on.

In addition, in the present exemplary embodiment, the display screen 210 displays states of the illuminants 206. As a result, an atmosphere around the information processing apparatus 100 can be recognized at once.

Here, the display screen 210 indicates the states of the illuminants 206 by displaying images corresponding to the illuminants 206 near the corresponding users.

In addition, the display screen 210 displays the images corresponding to the illuminants 206 in consideration of distances between the information processing apparatus 100 and the users.

More specifically, for example, an image (an image corresponding to an illuminant 206) for a user located far from the information processing apparatus 100 is displayed near the circumference 211 of the display screen 210, and an image (an image corresponding to an illuminant 206) corresponding to a user located near the information processing apparatus 100 is displayed near the center C of the display screen 210.

Figure 7:
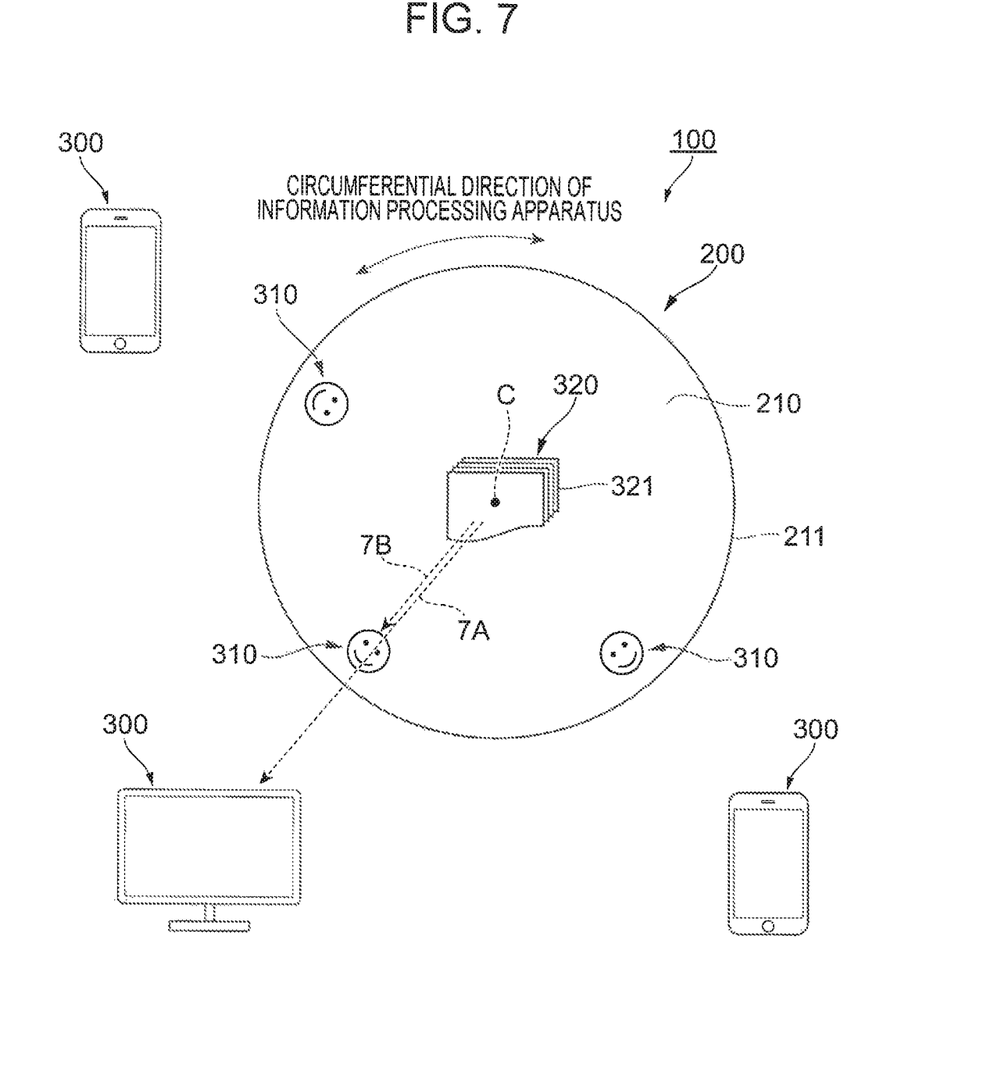
FIG. 7 is a diagram illustrating another example of the images displayed on the display screen.

FIG. 7 is a diagram illustrating another example of the images displayed on the display screen 210. In FIG. 7, users carry terminal apparatuses 300.

Here, the terminal apparatuses 300 are computer apparatuses. More specifically, the terminal apparatuses 300 are, for example, smartphones, tablets, personal computers (PCs), or the like. The terminal apparatuses 300 communicate with the information processing apparatus 100 using a wireless communication method. A known wireless communication method, such as Wi-Fi (registered trademark), Bluetooth (registered trademark), ZigBee (registered trademark), or ultra-wideband (UWE), may be used.

In the present exemplary embodiment, if a user carries a terminal apparatus 300, the terminal detection unit 251 detects the terminal apparatus 300, and the display control unit 252 causes the display device 200 to display a terminal image 310, which is an image corresponding to the terminal apparatus 300.

In this example, there are three users (not illustrated) around the information processing apparatus 100, and the users carry terminal apparatuses 300. In this case, three terminal images 310 are displayed.

In other words, in this example, there are plural terminal apparatuses 300 around the information processing apparatus 100, and the display control unit 252 causes the display device 200 to display terminal images 310 each corresponding to each of the terminal apparatuses 300. As a result, the display device 200 displays the plural terminal images 310.

Furthermore, in this example, information is provided for the terminal apparatuses 300. The display control unit 252 causes the display device 200 to display an information image 320, which is an image corresponding to the information provided for the terminal apparatuses 300.

More specifically, the display control unit 252 causes the display device 200 to display the information image 320 at the center C of the display screen 210.

Here, the "center C of the display screen 210" refers to the center of the display screen 210 in a radial direction when the display screen 210 is round and to a point at which a major axis and a minor axis intersect when the display screen 210 is elliptical. The "center C of the display screen 210" refers to a point at which diagonal lines intersect when the display screen 210 is tetragonal. In other words, the "center C of the display screen 210" refers to the center of gravity of the display screen 210.

In addition, when the display control unit 252 causes the display device 200 to display the information image 320 at the center C as described above, the display control unit 252 causes the display device 200 to display the information image 320 such that the center C is located within a circumference 321 of the information image 320. In other words, the display control unit 252 causes the display device 200 to display the information image 320 such that at least part of the information image 320 is located at the center C.

In addition, when the display control unit 252 causes the display device 200 to display the terminal images 310 in the present exemplary embodiment, the display control unit 252 causes the display device 200 to display the terminal images 310 at a side closer to the circumference 211 of the display screen 210 than the information image 320 as illustrated in FIG. 7.

In other words, the display control unit 252 causes the display device 200 to display the terminal images 310 on the display screen 210 far from the center C and close to the users. That is, in the present exemplary embodiment, the terminal images 310 are not displayed at the center C of the display screen 210.

Furthermore, in the present exemplary embodiment, a terminal image 310 is displayed on the display device 200 such that a direction from the center C of the display screen 210 to a corresponding terminal apparatus 300 (e.g., a direction indicated by an arrow 7A) and a direction from the center C of the display screen 210 to the terminal image 310 (e.g., a direction indicated by an arrow 7B) match.

More specifically, FIG. 7 illustrates a state in which the information processing apparatus 100 and the terminal apparatuses 300 are viewed from above, and, in this state, each of the terminal images 310 is displayed such that a direction from the center C of the display screen 210 to the corresponding terminal apparatus 300 and a direction from the center C of the display screen 210 to the terminal image 310 match.

In other words, in the present exemplary embodiment, the terminal images 310 are displayed on the display device 200 such that positions of the terminal apparatuses 300 in the circumferential direction of the information processing apparatus 100 and positions of the terminal images 310 in the circumferential direction match.

Here, in the present exemplary embodiment, the positions of the terminal apparatuses 300 (positions in the circumferential direction of the information processing apparatus 100) are identified on the basis of positions of the users who carry the terminal apparatuses 300.

More specifically, in the present exemplary embodiment, the processing unit 253 recognizes the user's faces on the basis of the information obtained by the cameras 208 to identify the users and the positions of the users.

The information processing apparatus 100 then determines that the terminal apparatuses 300 registered in advance in association with the users whose positions have been identified are located at the positions of the users. That is, in the present exemplary embodiment, information regarding the users and information regarding the terminal apparatuses 300 are associated with each other and registered to the information processing apparatus 100, the external server, or the like in advance. The positions of the users are identified, and it is determined that the terminal apparatuses 300 are located at the identified positions of the users.

Here, the term "match" refers not only to a case in which an angle between a direction from the center C of the display screen 210 to a terminal apparatus 300 and a direction from the center C to a corresponding terminal image 310 is 0° but also to a case in which the angle is smaller than 20°.

Figure 8A:
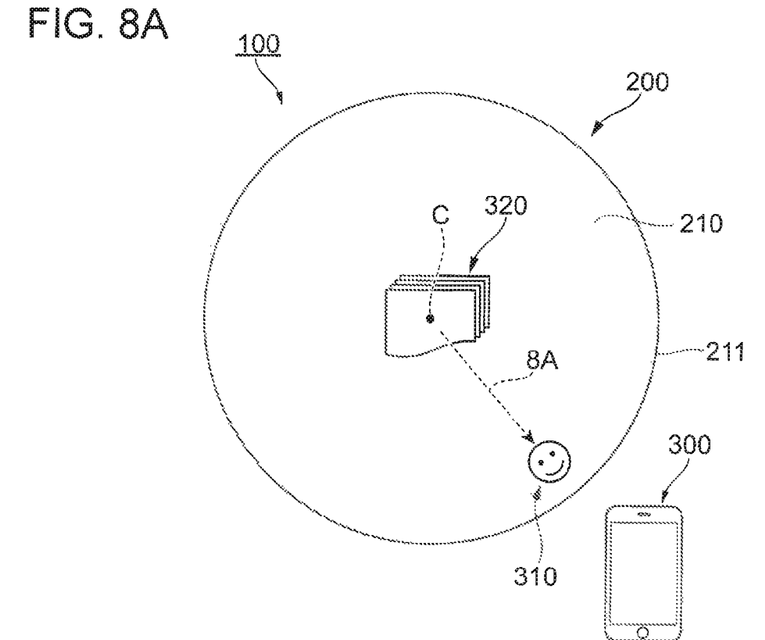
FIGS. 8A and 8B are diagrams illustrating changes in the display screen.
Figure 8B:
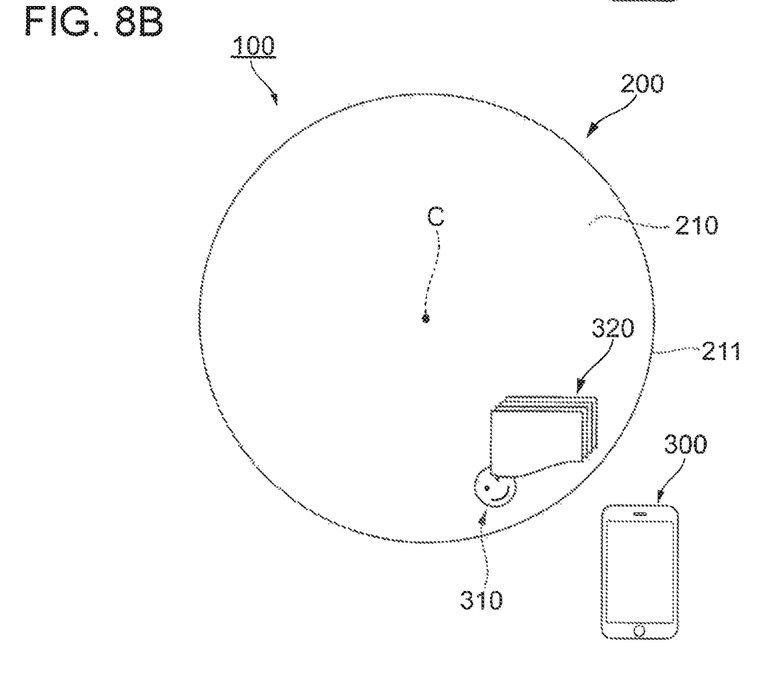
Figure 9:
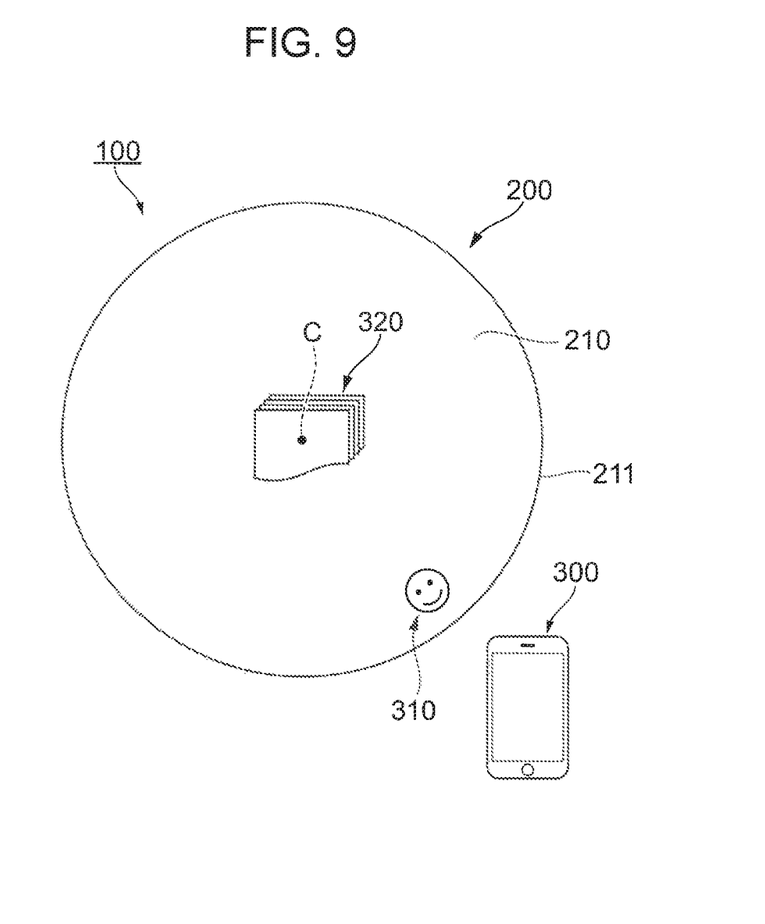
FIG. 9 is a diagram illustrating a change in the display screen.

FIGS. 8A, 8B, and 9 are diagrams illustrating changes in the display screen 210. In FIGS. 8A, 8B, and 9, an example of images when there is one terminal apparatus 300 around the information processing apparatus 100 is illustrated.

As described above, the display device 200 according to the present exemplary embodiment is a touch panel display device 200. By touching the display screen 210 with a finger, an information image 320 (refer to FIG. 8A) can be selected.

Furthermore, in the present exemplary embodiment, by moving the finger with which the information image 320 has been selected to a terminal image 310 as indicated by an arrow 8A illustrated in FIG. 8A, the information image 320 can be moved to the terminal image 310.

In the present exemplary embodiment, after the information image 320 moves to the terminal image 310 and the information image 320 at least partly overlaps the terminal images 310, the display screen 210 changes to the display screen 210 illustrated in FIG. 8B.

In other words, in the present exemplary embodiment, if a user performs an operation for associating an information image 320 with a terminal image 310, a switching process, which is an example of a predetermined process, is performed, and the display screen 210 switches to the display screen 210 illustrated in FIG. 8B.

In the example illustrated in FIGS. 8A and 8B, the terminal image 310 is an image indicating a person person's face). If an operation for associating the information image 320 the terminal image 310 is performed, the information image 320 overlaps the person indicated by the terminal image 310 as illustrated in FIG. 8B. In other words, if an operation for associating the information image 320 with the terminal image 310 is performed, the terminal image 310 changes.

As a result, in the present exemplary embodiment, a user can understand more clearly that the information processing apparatus 100 transmits information to a terminal apparatus 300.

Here, the "operation for associating the information image 320 with the terminal image 310" refers to an operation for displaying the information image 320 and the terminal image 310 in such a way as to indicate that the information image 320 and the terminal image 310 are associated with each other. An example of the "operation for associating the information image 320 with the terminal image 310" is, as described above, an operation for overlapping the information image 320 over the terminal image 310.

In addition, an operation for moving at least either the information image 320 or the terminal image 310 to the other, for example, may also be called the "operation for associating the information image 320 with the terminal image 310". In other words, an operation for reducing a distance between the information image 320 and the terminal image 310 may also be called the "operation for associating the information image 320 with the terminal image 310".

In addition, for example, an operation for displaying a line connecting the information image 320 and the terminal image 310 on the display screen 210 by moving a finger from either the information image 320 or the terminal image 310 to the other or an operation for selecting both information image 320 and the terminal image 310 and making colors of the information image 320 and the terminal image 310 the same, namely, for example, red, may also be called the "operation for associating the information image 320 with the terminal image 310".

In addition, for example, an operation for displaying a frame around the information image 320 and the terminal image 310 by drawing the frame with finger may also be called the "operation for associating the information image 320 with the terminal image 310".

Thereafter (after the state illustrated FIG. 8B is established), the information processing apparatus 100 transmits a predetermined signal to the terminal apparatus 300 in the present exemplary embodiment.

More specifically, if the information image 320 overlaps the terminal image 310, the information processing apparatus 100 transmits a predetermined signal to the terminal apparatus 300 using a communication method such as Bluetooth (registered trademark).

Upon receiving the signal, the terminal apparatus 300 asks, for example, the user (the person who carries the terminal apparatus 300) whether to receive information from the information processing apparatus 100.

If a response from the user positive, the response is transmitted to the information processing apparatus 100. Upon receiving the response, the information processing apparatus 100 transmits information corresponding to the information image 320 to the terminal apparatus 300 using a communication method such as Wi-Fi (registered trademark).

In the present exemplary embodiment, information corresponding to an information image 320 is thus provided for a terminal apparatus 300 corresponding to terminal image 310 on the basis of an operation for moving the information image 320 to the terminal image 310.

Although a case has been described in the present exemplary embodiment in which a terminal apparatus 300 issues an inquiry to a user and, if the user desires to receive information, the information is transmitted to the terminal apparatus 300, the inquiry issued by the terminal apparatus 300 to user may be omitted, instead.

In this case, after the operation for overlapping the information image 320 over the terminal image 310, the information processing apparatus 100 transmits information to the terminal apparatus 300 without issuing an inquiry.

Thereafter (after the information is transmitted to the terminal apparatuses 300), the terminal image 310 returns to an original state in the present exemplary embodiment as illustrated in FIG. 9.

More specifically, the information image 320, which has been overlapping the terminal image 310, returns to the center C of the display screen 210. In other words, the information image 320 and the terminal image 310 become no longer associated with each other.

In the present exemplary embodiment, an example has been described in which, if the information image 320 is moved to the terminal image 310, the information image 320 temporarily does not exist at the center C of the display screen 210 (refer to FIG. 8B).

This is just an example, and when the information image 320 is moved to the terminal image 310, a copy of the information image 320 may be moved to the terminal image 310. That is, the information image 320 may remain at the center C of the display screen 10.

In this case, a user can move an information image 320 to his/her own terminal image 310 while another user is moving the information image 320.

Although a case has been described in which the users move the information image 320 to their own terminal images 310, a person in charge, for example, may move the information image 320 to each of the terminal images 310. In other words, a person in charge may distribute the information image 320 to the terminal images 310.

Although a case has been described in which information is transmitted if an information image 320 is transmitted to a terminal image 310, information may be transmitted if a terminal image 310 is moved to an information image 320, instead.

Alternatively, information may be transmitted by moving a terminal image 310 and an information image 320 closer to each other.

Alternatively, for example, information may be transmitted if a flick operation (an operation for moving one of the two to the other) is performed on at least either an information image 320 or a terminal image 310.

Alternatively, a terminal image 310 may be displayed at the center C of the display screen 210, and an information image 320 may be displayed near the circumference 211 of the display screen 210. The information image 320 may be moved to the center C. Alternatively, on the other hand, the terminal image 310 at the center C may be moved toward the circumference 211. Alternatively, not either of the terminal image 310 and the information image 320 but both terminal image 310 and the information image 320 may be moved.

In addition, when the display screen 210 is tetragonal, for example, an information image 320 may be displayed in a left half of the display screen 210, and the information image 320 may be moved to a terminal image 310 displayed in a right half of the display screen 210.

Alternatively, when the display screen 210 is tetragonal, for example, an information image 320 may be displayed in an upper half of the display screen 210, and the information image 320 may be moved to a terminal image 310 displayed in a lower half of the display screen 210.

Figure 10A:
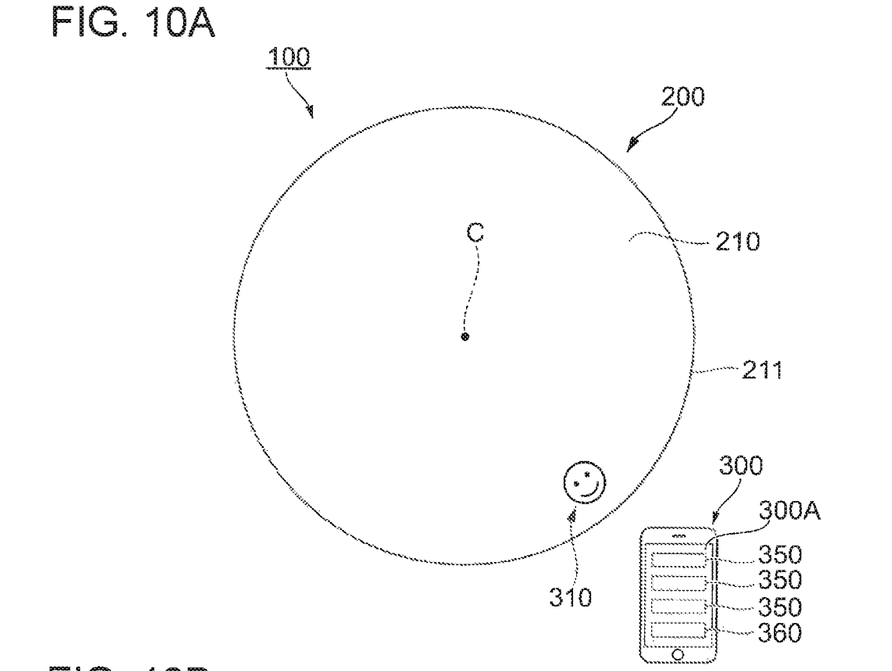
FIGS. 10A and 10B are diagrams illustrating the display screen at a time when a terminal apparatus transmits (provides) information to the information processing apparatus.
Figure 10B:
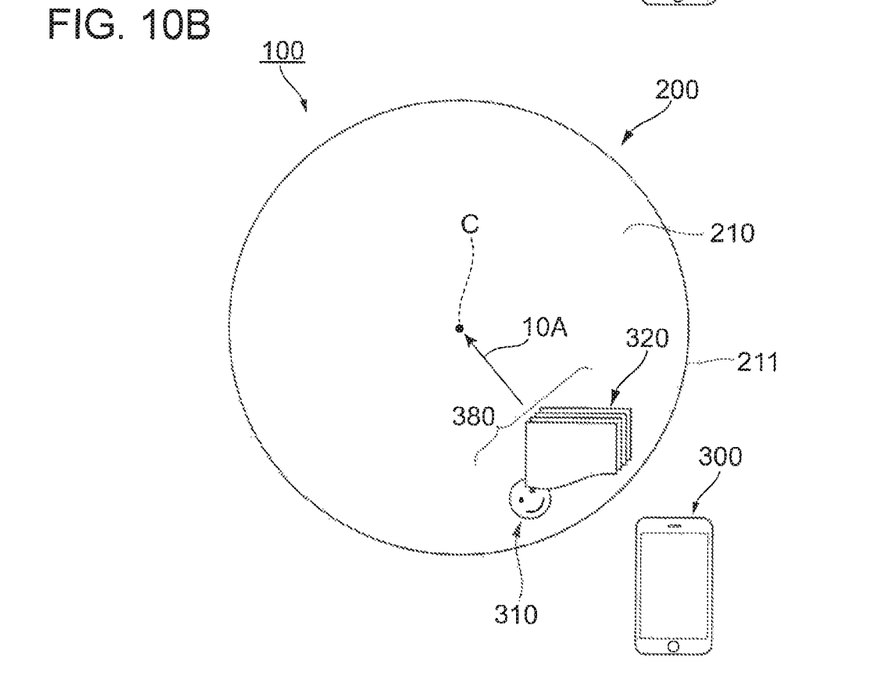

FIGS. 10A and 10B are diagrams illustrating the display screen 210 at a time when a terminal apparatus 300 transmits (provides) information to the information processing apparatus 100.

When the terminal apparatus 300 transmits information to the information processing apparatus 100, first, a user operates the terminal apparatus 300 to activate an application for transmitting information. As a result, as illustrated in FIG. 10A, a display screen 300A of the terminal apparatus 300 displays plural pieces of data (files) 350 such as image data and document data.

The user then operates the display screen 300A of the terminal apparatus 300, for example, to select a piece of data. 350 to be transmitted. The user then presses a transmission button 360.

As a result, the terminal apparatus 300 transmits information to the information processing apparatus 100 using a communication method such as Wi-Fi (registered trademark).

In the present exemplary embodiment, after the terminal apparatus 300 transmits information to the information processing apparatus 100, a terminal image 310 and an information image 320, which corresponds to the information transmitted from the terminal apparatus 300 (the information provided from the user of the terminal apparatus 300), are displayed on the display screen 210 of the information processing apparatus 100 as illustrated in FIG. 10B.

More specifically, in the present exemplary embodiment, in an initial state of the display screen 210, only the terminal image 310 is displayed as illustrated in FIG. 10A. After the terminal apparatus 300 transmits information to the information processing apparatus 100, the information image 320 is also displayed as illustrated in FIG. 10B.

Here, the terminal image 310 and the information image 320 are associated with each other on the display screen 210 illustrated in FIG. 10B.

More specifically, the terminal image 310 and the information image 320 at least partly overlap on the display screen 210 illustrated in FIG. 10B.

More specifically, in this example, too, the terminal image 310 is an image indicating a person (a person's face). The information image 320 overlaps the terminal images 310 on the display screen 210 illustrated in FIG. 10B.

Here, the terminal image 310 and the information image 320 (hereinafter referred to as "overlapping images 380") are displayed on the display screen 210 illustrated in FIG. 10B near the circumference 211 of the display screen 210, not near the center C.

The expression "the terminal image 310 and the information image 320 are associated with each other on the display screen 210" means that the terminal image 310 and the information image 320 are displayed in such a way as to indicate that the information image 320 and the terminal image 310 are associated with each other, and is not limited to the terminal images 310 and the terminal image 310 overlapping each other.

The expression "the terminal image 310 and the information image 320 are associated with each other on the display screen 210" may also be used for a case in which, for example, the terminal image 310 and the information image 320 are separated from each other but close to each other.

In addition, the expression "the terminal image 310 and the information image 320 are associated with each other on the display screen 210" may also be used for a case in which, for example, a line connecting the terminal image 310 and the information image 320 is displayed and a case in which the terminal image 310 and the information image 320 are displayed in the same color.

In addition, the expression "the terminal image 310 and the information image 320 are associated with each other on the display screen 210" may also be used for a case in which, for example, the terminal image 310 and the information image 320 are vertically or horizontally adjacent to each other. Furthermore, the expression "the terminal image 310 and the information image 320 are associated with each other on the display screen 210" may also be used for a case in which, for example, a line (frame) surrounding the terminal image 310 and the information image 320 is displayed.

Thereafter (after the images illustrated in FIG. 10B are displayed), in the present exemplary embodiment, the user selects (presses with a finger) the overlapping images 380 and moves the finger to the center C of the display screen 210 (in a direction indicated by an arrow IDA). As a result, the overlapping images 380 move to the center C of the display screen 210.

In the present exemplary embodiment, before the user moves the overlapping images 380, another image is not displayed at the center C of the display screen 210 as illustrated in FIG. 10B. As a result, the overlapping images 380 can move to the center C of the display screen 210.

In the present exemplary embodiment, when the overlapping images 380 have moved to the center C of the display screen 210, transmission of information from the terminal apparatus 300 to the information processing apparatus 100 is confirmed.

Thereafter, in the present exemplary embodiment, the display control unit 252 causes the display device 200 to remove the information image 320 (the information image 32 displayed over the terminal images 310) and return the terminal image 310 to its original position. That is, the display control unit 252 causes the terminal image 310 to move to a side closer to the circumference 211 of the display screen 210. As a result, the display screen 210 of the display device 200 returns to the state illustrated in FIG. 10A.

In addition, an image indicating a destination of the overlapping images 380 may be displayed at the center C of the display screen 210. The image indicating the destination of the overlapping images 380 may be, example, an image corresponding to the information processing apparatus 100 (an image indicating the information processing apparatus 100).

Alternatively, the image indicating the destination of the overlapping images 380 may be, for example, an arrow pointing to the center C of the display screen 210.

Alternatively, the image indicating the destination of the overlapping images 380 may be, for example, a text image, "Move to the center C of the display screen 210".

Although a case has been described in which the overlapping images 380 are located close to the circumference 211 of the display screen 210 and moved to the center C of the display screen 210, this is just an example.

Alternatively, when the display screen 210 is a tetragonal, for example, the overlapping images 380 may be displayed in a left half of the display screen 210 and may be moved to a right half. Alternatively, when the display screen 210 is a tetragonal, for example, the overlapping images 380 may be displayed in a lower half of the display screen 210 and moved to an upper half.

Modifications

Although a case has been described in which a terminal image 310 and an information image 320 are displayed and either or both of these images are moved to perform a process for transmitting information or the like, the process for transmitting information or the like may be performed even when a terminal image 310 and an information image 320 are not moved, instead.

For example, an operation reception unit for performing the process for transmitting information or the like, such as a transmission button, may be displayed on the display screen 210, for example, and if a user operates the operation reception unit, a predetermined process such as the process for transmitting information may be performed.

Although the touch panel display device 200 receives a user operation in the above description, a device such as a mouse or a pointing device may be provided, and the device may receive a user operation, instead.

The foregoing description the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display device;
a detection unit that detects a terminal apparatus located around the information processing apparatus and carried by a user;
a display control unit that displays, on the display device, a terminal image, which is an image corresponding to the terminal apparatus detected by the detection unit, and an information image, which is an image corresponding to information to be provided for the terminal apparatus; and
a detection unit that detects movement of the user around the information processing apparatus in a circumferential direction of the information processing apparatus, wherein
when the user around the information processing apparatus is detected as moving in the circumferential direction of the information processing apparatus, the display control unit causes the display device to change a content of display displayed on the display device by moving the images displayed on a display screen of the display device along a circumference of the display screen.

2. The information processing apparatus according to claim 1,
wherein the information corresponding to the information image is provided for the terminal apparatus corresponding to the terminal image on a basis of an operation for moving the information image to the terminal image.

3. The information processing apparatus according to claim 1,
wherein the display device is provided with the display screen facing upward, and
wherein, when the information processing apparatus is viewed from above, the terminal image is displayed on the display device with a direction from a center of the display screen of the display device to the terminal apparatus and a direction from the center to the terminal image matching.

4. The information processing apparatus according to claim 1,
wherein the display control unit displays the terminal image closer to the circumference of the display screen than the information image is.

5. The information processing apparatus according to claim 4,
wherein the display control unit displays the information image at a center of the display screen.

6. The information processing apparatus according to claim 1, further comprising:
a processing unit that performs a predetermined process when an operation for associating the information image and the terminal image with each other is performed.

7. The information processing apparatus according to claim 6,
wherein, when an operation for at least partly overlapping the information image and the terminal image is performed, the processing unit performs the predetermined process.

8. The information processing apparatus according to claim 6,
wherein, when an operation for moving either the information image or the terminal image to the other is performed, the processing unit performs the predetermined process.

9. The information processing apparatus according to claim 1,
wherein the information processing apparatus has a columnar shape, one end of the information processing apparatus is located on a floor side, and the other end of the information processing apparatus is provided with the display device facing upward.

10. The information processing apparatus according to claim 9,
wherein the information processing apparatus has a round shape or an elliptical shape in cross section, and the display screen of the display device has a round shape or an elliptical shape.

11. The information processing apparatus according to claim 1,
wherein, when the terminal apparatus is one of a plurality of terminal apparatuses located around the information processing apparatus, the display control unit displays terminal images each corresponding to one of the plurality of terminal apparatuses on the display device.

12. The information processing apparatus according to claim 11,
wherein the display device is provided with the display screen facing upward, and
wherein, when the information processing apparatus is viewed from above, each of the terminal images corresponding to each of the plurality of terminal apparatuses is displayed on the display device with a direction from a center of the display screen of the display device to the corresponding terminal apparatus and a direction from the center to the terminal image corresponding to the terminal apparatus matching.

13. The information processing apparatus according to claim 1, further comprising:
an illuminant; and
a user information display unit that displays information regarding the user around the information processing apparatus by changing a color of the illuminant.

14. A non-transitory computer readable medium storing a program causing a computer provided for an information processing apparatus including a display device to execute a process comprising:
displaying, on the display device, a terminal image, which is an image corresponding to a terminal apparatus carried by a user around the information processing apparatus;
displaying, on the display device, an information image, which is an image corresponding to information to be provided for the terminal apparatus;
detecting movement of the user around the information processing apparatus in a circumferential direction of the information processing apparatus; and
causing the display device to change a content of display displayed on the display device by moving the images displayed on a display screen of the display device along a circumference of the display screen when the user around the information processing apparatus is detected as moving in the circumferential direction of the information processing apparatus.

* * * * *